(12) United States Patent
Chatterjee et al.

(10) Patent No.: US 8,926,737 B2
(45) Date of Patent: Jan. 6, 2015

(54) PROCESS FOR PRODUCING PURIFIED NATURAL GAS

(75) Inventors: Arnab Chatterjee, Amsterdam (NL); Carolus Matthias Anna Maria Mesters, Amsterdam (NL); Ronald Jan Schoonebeek, Amsterdam (NL); Eri Ito, Amsterdam (NL)

(73) Assignee: Shell Oil Company, Houston, TX (US)

( * ) Notice: Subject to any disclaimer, the term of this patent is extended or adjusted under 35 U.S.C. 154(b) by 890 days.

(21) Appl. No.: 13/131,085

(22) PCT Filed: Nov. 26, 2009

(86) PCT No.: PCT/EP2009/065939
§ 371 (c)(1),
(2), (4) Date: Jun. 29, 2011

(87) PCT Pub. No.: WO2010/060975
PCT Pub. Date: Jun. 3, 2010

(65) Prior Publication Data
US 2011/0265380 A1    Nov. 3, 2011

(30) Foreign Application Priority Data
Nov. 28, 2008   (EP) .................................... 08170300

(51) Int. Cl.
*B01D 53/14*   (2006.01)
*C10L 3/10*   (2006.01)
*B01D 53/86*   (2006.01)

(52) U.S. Cl.
CPC ........ *B01D 53/8603* (2013.01); *B01D 53/1487* (2013.01); *C10L 3/10* (2013.01); *B01D 2257/306* (2013.01); *B01D 2258/06* (2013.01)

USPC .......................... 95/235; 48/127.7; 423/567.1

(58) Field of Classification Search
USPC .............. 95/235; 48/127.7; 423/567.1, 573.1, 423/576.8
See application file for complete search history.

(56) References Cited

U.S. PATENT DOCUMENTS

| | | | |
|---|---|---|---|
| 4,311,683 A | 1/1982 | Hass et al. | 432/573 |
| 4,632,818 A * | 12/1986 | Chen et al. | 423/576.8 |
| 4,886,649 A | 12/1989 | Ismagilov et al. | C01B 17/16 |
| 5,439,664 A * | 8/1995 | Heisel et al. | 423/567.1 |
| 6,207,127 B1 | 3/2001 | Geus et al. | 432/573.1 |
| 6,235,259 B1 | 5/2001 | Ledoux et al. | 423/573.1 |
| 8,419,832 B2 * | 4/2013 | Capdeville et al. | 95/235 |
| 2003/0194366 A1* | 10/2003 | Srinivas et al. | 423/573.1 |

(Continued)

FOREIGN PATENT DOCUMENTS

| | | | | |
|---|---|---|---|---|
| EP | 0409353 | 7/1990 | ............. | B01D 53/36 |
| EP | 1667933 | 4/2005 | ............. | C01B 17/00 |

(Continued)

OTHER PUBLICATIONS

Brok, T.J., "Integrated Treating Options for Sour Natural Gases"; GPA Conference; Sep. 20-22, 2006.

*Primary Examiner* — Jason M Greene

(57) ABSTRACT

The present invention provides a process for purifying natural gas, comprising removing mercaptans from a natural gas stream by a combination of an amine-based separation unit and a selective oxidation unit to obtain a purified natural gas stream, wherein at least part of the mercaptans are converted into at least elemental sulphur in the selective oxidation unit by selective catalytic oxidation.

10 Claims, 2 Drawing Sheets

(56) References Cited

U.S. PATENT DOCUMENTS

Figure 3:
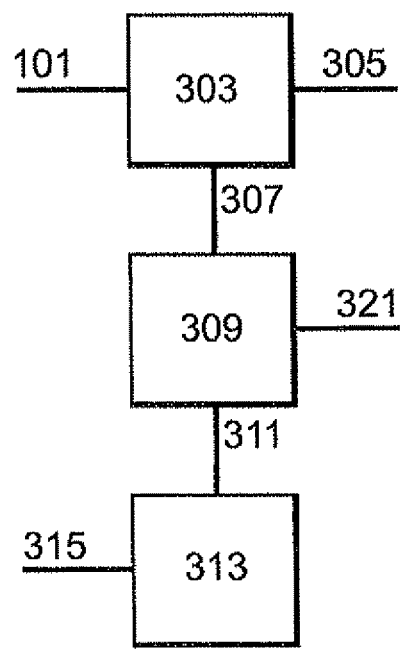

| | | | |
|---|---|---|---|
| 2005/0100504 A1* | 5/2005 | Geus et al. | 423/573.1 |
| 2008/0270272 A1* | 10/2008 | Branscomb | 705/30 |
| 2011/0206601 A1* | 8/2011 | Li et al. | 423/567.1 |
| 2011/0268650 A1* | 11/2011 | Lamar | 423/576.2 |

FOREIGN PATENT DOCUMENTS

| | | | | |
|---|---|---|---|---|
| EP | 1866061 | 10/2006 | | B01D 53/86 |
| WO | WO9960316 | 11/1999 | | F25J 1/02 |
| WO | WO0029797 | 5/2000 | | F25J 1/02 |
| WO | WO2007065765 | 6/2007 | | C01B 17/04 |

* cited by examiner

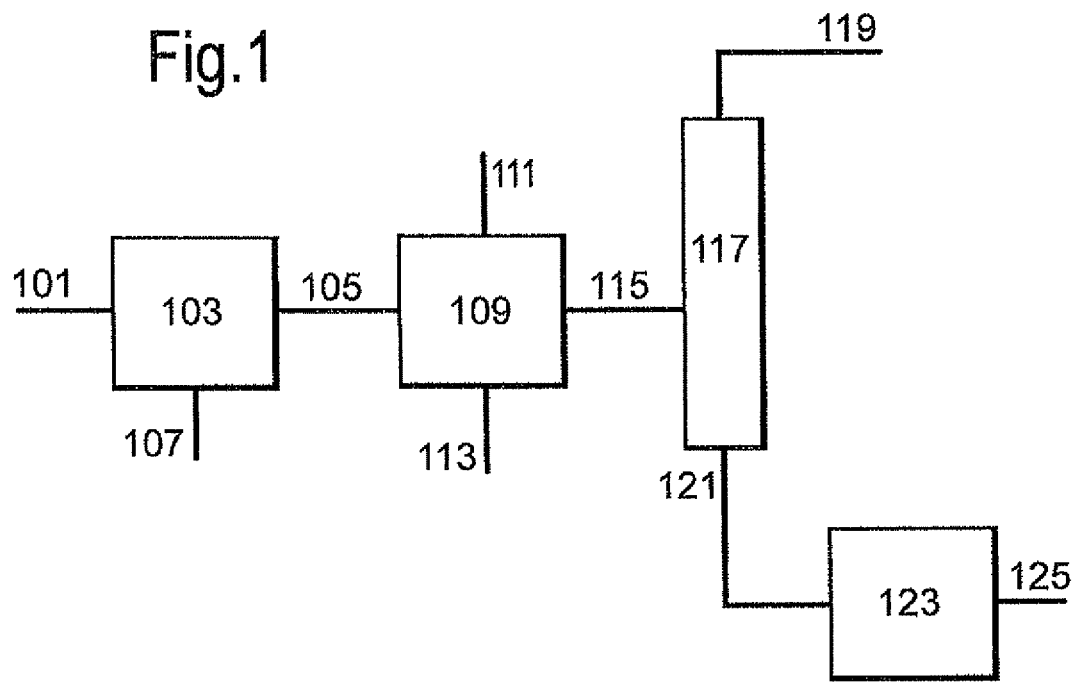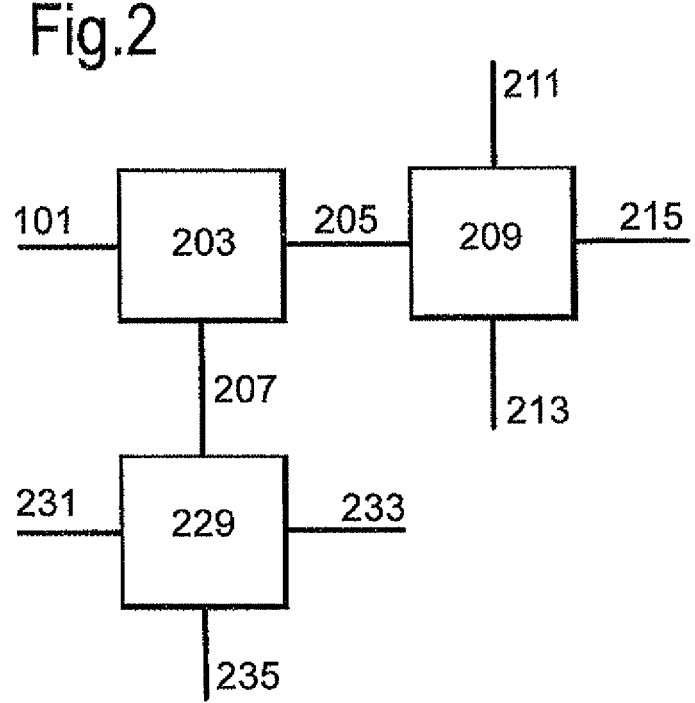

PROCESS FOR PRODUCING PURIFIED NATURAL GAS

PRIORITY CLAIM

The present application claims priority from PCT/EP2009/065939, filed 26 Nov. 2009, which claims priority from European Application 08170300.1, filed 28 Nov. 2008.

The invention relates to a process for producing purified natural gas.

Generally, natural gas comprises mainly methane and can further comprise other components such as higher hydrocarbons (e.g. ethane, propane, butanes, pentanes), nitrogen, carbon dioxide, sulphur contaminants and mercury. The amount and type of sulphur contaminants can vary. Common sulphur contaminants are hydrogen sulphide ($H_2S$), mercaptans (RSH) and carbonyl sulphide (COS).

Processes for producing purified natural gas generally involve removal of contaminants and of compounds other than methane from a feed natural gas stream to low levels, after which the resulting purified natural gas can be further used.

A conventional process is described in WO2007/065765, wherein a feed gas comprising hydrogen sulphide and mercaptans is purified. In this process the hydrogen sulphide is removed from the feed gas stream by an amine separation process and subsequently the mixture of hydrogen sulphide and mercaptans is treated to convert the hydrogen sulphide and mercaptans. A disadvantage of the process of WO2007/065765 is that the mixture of hydrogen sulphide and mercaptans must be separated prior to converting the hydrogen sulphide and mercaptans. According to WO2007/065765, the hydrogen sulphide is converted in a Claus unit. The off-gas of the Claus unit is further treated in a hydrogenation reactor, wherein sulphur dioxide is converted to hydrogen sulphide. A second hydrogenation reactor is provided to covert the mercaptans, wherein the second hydrogenation reactor is operated under different conditions compared to the first hydrogenation reactor. In the hydrogenation reactor the mercaptans are reduced to form hydrogen sulphide. This hydrogen sulphide is subsequently recycled to the Claus unit to be converted to sulphur. A further disadvantage is therefore that two separate hydrogenation reactors must be provided to convert both the hydrogen sulphide and the mercaptans.

Another conventional process for producing purified natural gas is outlined in the paper "Integrated Treating Options for Sour Natural Gases" presented on the GPA conference, 20-22 Sep. 2006 by T. J. Brok. In this process, a feed natural gas stream is led to an acid gas removal unit, where carbon dioxide as well as part of the mercaptans are removed. The resulting gas stream is led to a molecular sieve unit, where water and mercaptans are removed to low levels. The gas stream exiting the molecular sieve unit is led to a mercury removal unit, where mercury removal takes place. The gas exiting the mercury removal unit now comprises very little contaminants, in particular mercaptans. Typically, the amount of mercaptans in this gas stream is below 1 ppmv for each type of mercaptan compound. This gas stream is supplied to a separation column where methane is separated and withdrawn as a gaseous overhead stream and cooled to form LNG. The remaining part of the gas stream is subjected to further extraction steps to separate remaining hydrocarbons.

A disadvantage of this process is that it results in a molecular sieve bed loaded with mercaptans. Removal of mercaptans from the molecular sieve bed is needed, usually by contacting the molecular sieve bed with a stripping gas. The resulting stripping gas is loaded with mercaptans and needs to be treated, typically using an absorption process step, in order to be used again. In addition the mercaptans need to be further treated to convert them to e.g. polysulphides. Thus, the overall process involves many steps.

It has now been found that the above disadvantage can be overcome by providing a combination of an amine based separation unit and a selective oxidation unit to remove the mercaptans from a natural gas stream, thereby rendering the molecular sieve unit for capturing mercaptans obsolete and omitting the need for a separate mercaptan hydrogenation unit and subsequent hydrogen sulphide recycle.

Accordingly, the present invention provides for a process for purifying natural gas, comprising removing mercaptans from a natural gas stream by a combination of an amine-based separation unit and a selective oxidation unit to obtain a purified natural gas stream, wherein at least part of the mercaptans are converted into at least elemental sulphur in the selective oxidation unit by selective catalytic oxidation.

In a further aspect the invention provides a process for purifying natural gas, comprising:
i) providing a mercaptan-comprising natural gas stream to an amine-based separation unit;
ii) contacting the mercaptan-comprising natural gas stream with an amine-containing absorption liquid in the amine-based separation unit and separating the stream into a first natural gas stream enriched in mercaptan, and a second stream;
iii) providing at least part of the first natural gas stream enriched in mercaptan to a selective catalytic oxidation unit and converting at least part of the mercaptans into at least elemental sulphur in the selective oxidation unit by selective catalytic oxidation to obtain a purified natural gas stream depleted in mercaptan.

In another aspect, the present invention provides a process for purifying natural gas, comprising:
i) providing a mercaptan-comprising natural gas stream to an amine-based separation unit;
ii) contacting the mercaptan-comprising natural gas stream with an amine containing absorption liquid in the amine-based separation unit and separating the stream into a purified natural gas stream, and a second stream enriched in mercaptan;
iii) providing at least part of the second stream to a selective catalytic oxidation unit and converting at least part of the mercaptan into at least elemental sulphur in the selective oxidation unit by selective catalytic oxidation.

In an even further aspect, the present invention provides a process for purifying natural gas, comprising
i) providing a mercaptan-comprising natural gas stream to a selective oxidation unit,
ii) converting at least part of the mercaptans in the stream into at least elemental sulphur in the selective oxidation unit by selective catalytic oxidation to obtain a first natural gas stream;
iii) contacting at least part of the first natural gas stream with an amine containing absorption liquid in an amine-based separation unit and separating the first natural gas stream into a purified natural gas stream and a second stream.

In the process according to the invention mercaptans are removed from a mercaptan-comprising natural gas stream without the need for a complex molecular sieve unit and are directly converted to polysulphides, sulphur and/or water.

Additionally, the process according to the invention also provides the possibility of reducing any hydrogen sulphide, carbon dioxide, water and/or COS content in the natural gas.

Moreover, the process according to the invention is particularly advantageous when the stream is enriched with $CO_2$ compared to H₂S so that the stream cannot be directly processed by conventional Claus process or required thus additional pre-processing (like enrichment amine unit to reduce $CO_2/H_2S$ ratio) before Claus, which is less cost effective.

Reference herein to natural gas is to a gas, which generally comprises mainly methane and can further comprise other components such as higher hydrocarbons (e.g. ethane, propane, butanes, pentanes), nitrogen, carbon dioxide, sulphur contaminants and mercury. The amount and type of sulphur contaminants can vary. Common sulphur contaminants are hydrogen sulphide ($H_2S$), mercaptans (RSH) and carbonyl sulphide (COS).

Reference herein to mercaptans (RSH) is to aliphatic mercaptans, especially $C_1$-$C_6$ mercaptans, more especially $C_1$-$C_4$ mercaptans, aromatic mercaptans, especially phenyl mercaptan, or mixtures of aliphatic and aromatic mercaptans. The invention especially involves removal of methyl mercaptan (R=methyl), ethyl mercaptan (R=ethyl), normal- and iso-propyl mercaptan (R=n-propyl and iso-propyl) and butyl mercaptan (R=butyl) isomers.

Reference herein to an amine-based separation unit is to an unit comprising an amine-containing absorption liquid. The amine based separation unit is further also referred to as amine unit. The amine based separation unit uses a washing process wherein a gas stream is washed with a chemical solvent, i.e. an aqueous amine solution, and optionally a physical solvent. The gas stream is separated by chemical and/or physical adsorption of certain components in the gas stream (solvent extraction). The use of such aqueous amine solutions for removing so-called acidic gases as hydrogen sulphide and optionally, mercaptans, carbon dioxide and/or COS from a gas stream containing these compounds has been extensively described in the art. See for instance A. L. Kohl and F. C. Riesenfeld, 1974, Gas Purification, 2nd edition, Gulf Publishing Co. Houston and R. N. Maddox, 1974, Gas and Liquid Sweetening, Campbell Petroleum Series.

On an industrial scale, absorption liquids can in principal be classified in two categories, depending on the mechanism to absorb the acidic components: chemical solvents and physical solvents. Each solvent has its own advantages and disadvantages as to features as loading capacity, kinetics, regenerability, selectivity, stability, corrosivity, heating/cooling requirements etc.

Chemical solvents, which are useful in the process of the present invention, preferably, comprise an aliphatic alkanolamine and a primary or secondary amine as activator. Suitable aliphatic alkanolamines include tertiary alkanolamines, especially triethanolamine (TEA) and/or methyldiethanolamine (MDEA). Suitable activators include primary or secondary alkanolamines, especially those selected from the group of piperazine, methylpiperazine and morpholine. Preferably, the chemical solvent comprises in the range of from 1.0 to 5 mol/l, more preferably from 2.0 to 4.0 mol/l of aliphatic alkanolamine. Preferably, the chemical solvent comprises in the range of from 0.5-2.0 mol/l, more preferably from 0.5 to 1.5 mol/l of the primary or secondary amine as activator. Especially preferred is a chemical solvent comprising MDEA and piperazine. Most preferred is a chemical solvent comprising in the range of from 2.0 to 3.0 mol/l MDEA and from 0.8 to 1.1 mol/l piperazine. It has been found that the preferred absorbing liquids effect an efficient removal of carbon dioxide, COS and hydrogen sulphide.

Physical solvents, which are suitable in the process of the present invention include cyclo-tetramethylenesulfone and its derivatives, aliphatic acid amides, N-methylpyrrolidone, N-alkylated pyrrolidones and the corresponding piperidones, methanol, ethanol and mixtures of dialkylethers of polyethylene glycols or mixtures thereof. Physical solvents are generally used in combination with chemical solvents. Such combinations are referred to as mixed solvents. In such a mixed solvent, the preferred physical solvent is sulfolane. The preferred amine is a secondary or tertiary amine, preferably an amine compound derived from ethanol amine, more especially DIPA, DEA, MMEA (monomethyl-ethanolamine), MDEA, or DEMEA (diethyl-monoethanolamine), preferably DIPA or MDEA. A preferred mixed solvent is sulphinol.

The mixed solvent comprises preferably 15 to 35 wt %, 20 to 40 wt % of a physical solvent and 40 to 55 wt % of an amine, based on the total solution.

They perform very well at high pressures, especially between 20 and 90 bara.

In an amine unit, the loaded solvent is regenerated and recycled back to the absorption process, while the desorbed gases are retrieved preferably as the second stream from the amine based separation unit. It will be appreciated that in the present invention the amine unit contains an absorption and regeneration/desorption unit.

Reference herein to selective catalytic oxidation (SCO) is to the selective oxidation of mercaptans and hydrogen sulphide to elemental sulphur, water and, in case of mercaptans, polysulphides. Reference herein to water is to water or steam. The reaction is selective in the sense that compounds other than mercaptans and hydrogen sulphide, such as hydrocarbons, are not or hardly oxidized. This has the advantage that there is no need to separate mercaptans and hydrogen sulphide from the other gas components, such as in the Claus process.

The present invention relates to a process for purifying natural gas, in particular natural gas comprising mercaptans. In the process according to the invention a mercaptan-comprising natural gas stream is purified by providing the natural gas stream to an amine unit. In the amine unit, the natural gas stream is contacted with an amine-containing absorption liquid. The natural gas stream is separated into a first natural gas stream, preferably enriched in mercaptan, and a second stream. Preferably, the second stream is depleted in mercaptan. Also preferably, the second stream comprises those components of the natural gas stream preferentially absorbed in the amine unit. Subsequently, the at least part of first natural gas stream is provided to least one SCO unit. In the SCO unit at least part of the mercaptans in the first natural gas stream are converted by selective oxidation. In addition, at least part of any hydrogen sulphide present in the first natural gas stream is converted.

A purified natural gas stream, preferably depleted in mercaptans, is obtained from the SCO unit and can be used in a further application or process.

Preferably, the second stream is also treated to remove or convert sulphur comprising compounds such as hydrogen sulphide or any residual mercaptans. The second stream may be treated using any suitable process in the known in the art for removing sulphur compounds and may depending on the exact composition of the second stream preferably include a further SCO process or a Claus process.

It is preferred that the amine unit as described above utilises essentially only chemical solvents, and optionally an activator. Such an amine unit is herein referred to as a selective amine-based separation unit or selective amine unit. In the selective amine unit hydrogen sulphide, carbon dioxide and/or COS present in the natural gas stream are selectively adsorbed, while essentially no mercaptans, methane or C2+ hydrocarbons are adsorbed. Reference herein to C2+ hydrocarbons is to hydrocarbons having two or more carbon atoms, including ethane, propane, butanes, pentanes. Thus, the selective amine unit will selectively remove hydrogen sulphide, carbon dioxide and COS from the natural gas stream. As a consequence, the mercaptans remain in the first natural gas stream.

An advantage of this process is that without the need for using a complex molecular sieve unit, the mercaptan content in the natural gas may be significantly lowered, while a high hydrocarbon recovery in the purified natural gas stream is obtained, i.e. the hydrocarbons remain in the first natural gas stream rather than in the second stream.

The present invention also relates to another process for purifying natural gas, in particular natural gas comprising mercaptans, wherein a mercaptan-comprising natural gas stream is provided to an amine unit and contacted therein with an amine-containing absorption liquid. The natural gas stream is now separated into a purified natural gas stream, preferably depleted in mercaptans and a second stream comprising mercaptan. Preferably, the second stream is enriched in mercaptan. Also preferably, the second stream comprises those components of the natural gas stream preferentially absorbed in the amine unit. Subsequently, at least part of the second stream is provided to least one SCO unit. In the SCO unit at least part of the mercaptans in the second stream are converted by selective oxidation. In addition, at least part of any hydrogen sulphide present in the second stream is converted.

Preferably, the purified natural gas stream is further treated to remove or convert any residual sulphur comprising compounds such as hydrogen sulphide or mercaptans. The purified natural gas stream may be treated using any suitable process in the known in the art for removing sulphur compounds from hydrocarbon containing streams, preferably a further SCO process, wherein at least part of any residual mercaptans in the first stream are converted to elemental sulphur, polysulphide and water. In addition, any remaining hydrogen sulphide content in the first stream is also reduced by converting the hydrogen sulphide to elemental sulphur and water.

The purified natural gas stream can be used in a further application or process.

In this process is preferred to use an amine unit utilising mixed solvents, i.e. a mixture of a chemical and a physical solvent. Such an amine unit is herein referred to as a non-selective amine based separation unit or non-selective amine unit. In a non-selective amine unit hydrogen sulphide, carbon dioxide and/or COS present in the natural gas stream are adsorbed while in addition also significant amount of mercaptans and C2+ hydrocarbons, are adsorbed. Methane is typically not absorbed or absorbed in minimal amounts.

The second stream obtained from the non-selective amine unit may thus comprise in addition to mercaptans, hydrogen sulphide, carbon dioxide, COS and additionally C2+ hydrocarbons. The second stream is provided to a SCO unit to lower the hydrogen sulphide and mercaptan content in the second stream by converting them to elemental sulphur, polysulphide and water. The stream exiting the SCO may comprise significant amounts of C2+ hydrocarbons and may be sent to for instance and incinerator to provide heat. Any hydrogen sulphide present in the stream exiting the SCO unit may be provided to a Claus unit to be converted to elemental sulphur and water.

By applying a non-selective amine unit to treat the mercaptan-comprising natural gas stream, the mercaptan content in the natural gas is significantly lowered. As a consequence, less or essentially no mercaptans need to be removed from the natural gas stream before further processing. In addition, the mercaptans are concentrated in a stream having a significantly smaller volume compared to the initial natural gas stream, thus requiring a much smaller SCO unit.

The present invention also provides a further process for purifying natural gas. In this process a mercaptan-comprising natural gas stream is first provided to a SCO unit, wherein at least part of the mercaptans in the mercaptan-comprising natural gas stream are converted to elemental sulphur, polysulphides and water. In addition, the hydrogen sulphide content in the natural gas stream is also reduced by converting the hydrogen sulphide to elemental sulphur and water. A first natural gas stream is obtained from the SCO unit. This first natural gas stream is preferably depleted in mercaptans. At least part of the first natural gas stream is provided to a, preferably selective, amine unit to remove for instance residual hydrogen sulphide, carbon dioxide and COS and depending on the type of amine unit used optionally residual mercaptans. From the amine unit a purified natural gas stream and second gas stream are obtained, whereby the second gas stream is preferably enriched in hydrogen sulphide, COS and/or carbon dioxide and optionally mercaptan. By using a selective amine unit, loss of valuable C2+ hydrocarbons due to non-selective absorption is reduced and an increased hydrocarbon recovery is achieved.

If a stoichiometric excess of oxidant is used in the SCO unit the first natural gas stream obtained from the SCO unit may comprise some oxidant. It may be preferred to remove oxidant from this gas stream to prevent oxidation of the amine-based absorption liquid. In case the oxidant is for instance oxygen, the oxygen may for example be removed by leading the gas stream over an absorption bed comprising a hydrated iron sulphide compound or another metal sulphide compound that is converted to its oxide and elemental sulphur upon contacting it with oxygen. Such metal sulphide compounds that are suitable as oxygen absorbent are known in the art. When the absorbent is substantially saturated with oxygen, i.e. a substantial part of the metal sulphide compound is converted into its oxide, it will be regenerated by contacting it, preferably after vaporizing the sulphur formed, with a hydrogen sulphide containing gas.

Irrespective of the purification process used, it may be desirable to remove water from the purified natural gas stream. Preferably, any water is removed using state of the art dewatering processes such a glycol- or molsieve-based dewatering and Joule-Thompson cycles. The choice of dewatering is based on the required level of moisture in the purified gas stream.

In the process according to the invention, the obtained purified natural gas stream may be further separated in a separation column, e.g. a demethaniser. The purified natural gas stream may be separated into a gaseous overhead stream, preferably enriched in methane, and a stream enriched in C2+ hydrocarbons, further also referred to as C2+ stream. The gaseous overhead stream is withdrawn from the separation column to obtain a further purified natural gas. The further purified natural gas can be processed in known manners. For example, the further purified natural gas can be subjected to catalytic or non-catalytic combustion, to generate electricity, heat or power, or can be converted to synthesis gas or can be applied for residential use.

Preferably, the purified natural gas is cooled to obtain liquefied natural gas (LNG) as for example described in WO 99/60316 or WO 00/29797, the contents of which patent applications are incorporated herein. Therefore, the invention also provides LNG formed by cooling the purified natural gas obtained by the process according to the invention.

The composition of the C2+ stream may vary and depends inter alia on the operation conditions of the separation column. Preferably, the C2+ stream is essentially free of methane and comprises any residual mercaptans and optionally COS present in the purified natural gas. Preferably, the C2+ stream comprises at most 5 mol %, preferably at most 1 mol % of methane.

It will be understood that the amount of mercaptans in the C2+ stream will depend on the amount of residual mercaptans in the purified natural gas stream supplied to the separation column.

Preferably, the C2+ stream comprises at least 80 mol % of C2+ hydrocarbons.

In this preferred embodiment, the separation column is suitably operated at a pressure in the range of from 20 to 40 bara, preferably from 25 to 35 bara. The purified natural gas stream may be supplied to the separation column at any temperature, preferably in the range of from −150 to 100° C., suitably at a temperature in the range of from −85 to 0° C.

The C2+ stream is withdrawn from the separation column, preferably as a bottom stream.

Preferably, the C2+ stream may subjected to a mercaptan and optionally COS removal step, optionally followed by subsequent fractionation steps and if necessary mercaptan removal steps to obtain separate, C2, C3, C4 and optionally higher hydrocarbon fractions.

In the process according to the invention, separation of the purified natural gas stream may be preceded by expansion of the purified natural gas. The advantage of separation at lower pressure is that a better fractionation of purified natural gas into the various hydrocarbons is achieved. Furthermore, the temperature decrease achieved by expanding the purified natural gas greatly facilitates the recovery of C2+ hydrocarbons as well as residual mercaptan compounds in the bottom stream. This may allow for the removal of residual mercaptans by concentrating the mercaptans in the C2+ stream and separately treating the C2+ stream. Residual mercaptan removal can now be done on a relatively small volumetric flow. In case the purified natural gas stream is expanded, a de-pressurised purified natural gas stream is obtained. It will be understood that the extent of expansion is dependent on various factors, among which the composition of the natural gas and the desired contaminant concentrations of the purified natural gas. Without wishing to restrict the invention to a specific range, it has been found that a pressure difference between the pressurised purified natural gas and the de-pressurised purified natural gas of at least 10 bara, preferably at least 15 bara, more preferably at least 20 bara results in a good separation.

Preferably, the mercaptans in the C2+ stream are removed by any process known in the art for removing mercaptans. One such process comprises contacting the C2+ stream with a hydroxide solution, for example sodium hydroxide or potassium hydroxide or a mixture of these (see for example in R. N. Maddox and D. J. Morgan in "Gas Conditioning and Processing", volume 4: Gas Treating and Liquid Sweetening, Campbell Petroleum Series, Norman, Okla., 1998). In a second mercaptan removal method, mercaptans are removed by contacting the C2+ stream with a hydrodesulphurisation catalyst in the presence of hydrogen to obtain hydrogen sulphide.

More preferably, the mercaptans are removed using a SCO or caustic process.

In the process according to the present invention at least part of the mercaptans present in the natural gas stream are converted in a SCO unit by selective catalytic oxidation (SCO) to elemental sulphur, polysulphide and water. SCO processes allow for the removal of mercaptans to low levels, in the ppm range and for some mercaptans even in the ppb range. Typical, mercaptan concentrations in the gas stream exiting the SCO unit will be in the range of from 100 ppbv to 0.1 vol %. Without wishing to be bound by any specific theory on mercaptan removal, it is believed that mercaptans are converted to polysulphides and elemental sulphur and water, whereby the mercaptan is first converted to a polysulphide by reaction with liquid sulphur and hydrogen sulphide and subsequently the hydrogen sulphide is selectively catalytically oxidized to elemental sulphur and water. It will be appreciated that any hydrogen sulphide already present in the mercaptan-comprising natural gas stream is also converted to elemental sulphur and water.

In SCO, hydrogen sulphide is selectively catalytically oxidized by contacting hydrogen sulphide and oxidant with a suitable catalyst, e.g. in a SCO unit comprising such a suitable catalyst. It will be appreciated that the hydrogen sulphide may have been supplied to the SCO unit, as hydrogen sulphide, which is comprised in the feed gas or in the form of another component, e.g. a mercaptan, which is subsequently converted in the SCO unit to at least hydrogen sulphide.

In one possible reaction using oxygen as oxidant, hydrogen sulphide is selectively oxidised according to the following reaction:

$$2H_2S + O_2 \Rightarrow 2H_2O + 2/nS_n \quad (1).$$

The SCO may be any SCO process known in the art, such as for instance described in U.S. Pat. No. 4,886,649, U.S. Pat. No. 4,311,683, U.S. Pat. No. 6,207,127 and EP1667933. Preferably, the SCO process is a process such as described in EP1667933 or EP1866061, which are hereby incorporated by reference. In the SCO process of EP1667933, hydrogen sulphide is converted in a SCO process. In the present invention, the SCO process of EP1667933 may be used to convert mercaptans by providing a mercaptan-comprising gas stream, for instance the mercaptan-comprising natural gas stream, the first natural gas stream or the second stream obtained from the amine unit, an inert liquid medium, and an oxidant containing gas to a reaction zone comprising at least one catalytic zone comprising an oxidation catalyst to form polysulphide, elemental sulphur and a gaseous stream depleted in mercaptan. The polysulphides dissolve in the liquid medium and leave the SCO unit with the liquid medium. This is in particular the case when the liquid medium is liquid elemental sulphur. In this SCO process, the oxidation catalyst of each catalytic zone is contacted with mercaptan and/or an oxidant in the presence of inert liquid medium at a temperature in the range of from 120 to 160° C., preferably of from 125 to 150° C. The SCO process is preferably operated at elevated pressure, more preferably a pressure in the range of from 2 to 200 bar (absolute), even more preferably in the range of from 10 to 150 bar (absolute). Most preferably, the operating pressure is in the range of from 20 to 120 bar (absolute). By operating under such conditions the elemental sulphur formed is essentially in liquid form and may be removed from the reaction zone with the inert liquid medium.

The inert liquid medium may be a liquid compound that is not substantially consumed under the process conditions. Examples of such liquids are paraffins like n-pentane, n-hexane, n-heptane, n-octane and mixtures thereof, refinery hydrocarbon streams such as naphtha or kerosine, crude oil, toluene, xylene, alkanol amines and sulfinol. Preferably, the inert liquid medium is liquid elemental sulphur, e.g. liquid sulphur obtained during the selective oxidation of sulphur compounds in the feed gas.

The oxidation catalyst, described in EP1667933, may be any oxidation catalyst suitable for the selective oxidation of hydrogen sulphide. Such oxidation catalysts are known in the art and typically comprise an oxide and/or a sulphide compound of one or more metals. They are generally in the form of a refractory oxide material on which a catalytically active material has been deposited. The oxidation catalyst may comprise as catalytically active material any material that is capable of performing an oxidation reaction. Oxide and/or sulphide compounds of a metal are known to be suitable catalytically active materials for this purpose. The metal may for example be vanadium, chromium, manganese, iron, cobalt, molybdenum or combinations thereof. Examples of prior art catalysts for the selective oxidation of hydrogen sulphide are iron oxide-chromium oxide on silica, iron oxide-phosphorus oxide on silica, iron oxide-sodium oxide on silica (EP-A-0409353) magnesium chromite on alumina, vanadium pentoxide on alumina (U.S. Pat. No. 4,886,649) and silicon carbide supporting an active phase comprising nickel in the oxysulfide form (U.S. Pat. No. 6,235,259). Preferably, the catalytically active material is an oxide and/or sulphide compound of iron or an iron comprising mixed metal oxide and/or sulphide compound, more preferably the catalytically active material comprises a hydrated iron oxide compound.

The oxidant may be molecular oxygen, e.g. in the form of a molecular oxygen-comprising gas. Examples of suitable molecular-oxygen comprising gases are oxygen, air or oxygen-enriched air. The oxygen concentration in the molecular-oxygen containing gas is not critical. It will be appreciated that the preferred oxygen concentration depends primarily on the concentration of the mercaptan in the mercaptan-comprising gas supplied to the SCO unit.

The oxidant may also be sulphur dioxide, e.g. in the form of a sulphur dioxide-comprising gas. When using sulphur dioxide the amount of sulphur dioxide provided to the SCO process may be equal to the amount of oxygen provided when oxygen is oxidant. In case of sulphur dioxide as oxidant, the preferred catalyst is a catalyst comprising titanium dioxide or activated alumina or a combination thereof. Preferably, the catalyst is a $TiO_2$-comprising catalyst, optionally comprising promoters for the hydrolysis reaction such as K. The catalyst may additionally comprise an oxide compound of one or more other metals, preferably vanadium, chromium, manganese, iron, cobalt, molybdenum or combinations thereof. More preferably, an oxide of iron or an iron comprising mixed metal oxide.

It is believed that the additional metal, in particular iron, oxides enhance reactivity and act as a scavenger especially in the early stages of the reaction.

By using a titanium oxide-comprising catalyst any COS and $CS_2$ present in the feed to the SCO unit or formed in the SCO unit will be catalytically hydrolysed with water, such as the water produced by the conversion of mercaptans or hydrogen sulphide, to carbon dioxide and hydrogen sulphide. The hydrogen sulphide is subsequently oxidised with sulphur dioxide to water and sulphur. The use of sulphur dioxide has a number of advantages over using oxygen as oxidant. Sulphur dioxide dissolves better in the liquid sulphur surrounding the catalyst and additionally there is no direct need to provide an inert liquid medium to the reaction zone. Due to the fact the reaction between sulphur dioxide and hydrogen sulphide is less exothermic than the reaction using oxygen as the oxidant, less heat needs to be removed from the process and an inert liquid medium is only required when high mercaptan and/or hydrogen sulphide concentrations are present in the feed to the SCO unit. The sulphur dioxide can be at least partly be obtained by combusting at least part of the elemental sulphur obtained from the SCO unit.

The overall molar ratio of oxidant to sulphur species, i.e. mercaptan, and optionally hydrogen sulphide, COS and $CS_2$ in the gas supplied to the SCO unit may preferably be in de range of from 0.1 to 10, more preferably 0.30 to 3.0, even more preferably of from 0.50 to 2.0. In order to achieve deep desulphurisation, i.e. to obtain a gas having less than 1 ppmv of mercaptan and/or less than 1 ppmv hydrogen sulphide, the overall molar ratio is, suitably at least slightly, above the stoichiometric ratio of 0.50. Thus, a ratio of oxidant to sulphur species of in the range of from 0.51 to 10, or 0.51 to 1.5, or even of from 0.60 to 1.5 is particularly preferred. By using an above stoichiometric ratio of oxidant to sulphur species, the equilibrium of the conversions of mercaptan, COS and $CS_2$ are drawn to the product side.

In case sulphur dioxide is used as the oxidant, the oxidation catalyst of each catalytic zone is preferably contacted with mercaptan and an oxidant in the presence of inert liquid medium at a temperature in the range of from 120 to 150° C., preferably of from 125 to 135° C. and at a pressure in the range of from 4 to 150 bar (absolute), more preferably in the range of from 10 to 60 bar (absolute), even more preferably in the range of from 10 to 40 bar (absolute).

The mercaptan-comprising natural gas stream supplied to the process according to the invention may be any natural gas stream comprising mercaptans. It will be appreciated that the composition of the natural gas stream depends on the natural gas field it is extracted from. Typically, the natural gas comprises predominantly methane, preferably in the range of from 40 to 99 vol % methane, more preferably 60 to 95 vol % methane, more preferably 60 to 90 vol % methane, based on the total mercaptan-comprising natural gas stream. Preferably, the amount of mercaptans in the natural gas stream supplied to process is in the range of from 4 ppmv to 5 vol %, based on the total mercaptan-comprising natural gas stream, preferably from 5 ppmv to 5 vol %, more preferably from 6 ppmv to 3 vol %, still more preferably from 10 ppmv to 1500 ppmv. The mercaptan-comprising natural gas stream may also comprise other components such as one or more of hydrogen sulphide, carbon dioxide, water, $C^{2+}$ hydrocarbons or COS.

The mercaptan-comprising natural gas stream may typically comprise in the range of from 0.1 to 5000 ppmv, more typically 0.1 ppmv to 2500 ppmv of COS, based on the total mercaptan-comprising natural gas stream.

The mercaptan-comprising natural gas stream typically comprises in the range of from 0.03 to 25 vol % of C2+, based on the total feed gas stream.

The mercaptan-comprising natural gas stream may comprise up to 50 vol % hydrogen sulphide, based on the total mercaptan-comprising natural gas stream. The natural gas stream may comprise in the range of from 0 to 40 vol % carbon dioxide, preferably of from 0 to 30 vol % carbon dioxide, based on the total mercaptan-comprising natural gas stream.

The mercaptan-comprising natural gas stream supplied to the process may be at any suitable pressure, typically in the range of from 30 to 75 bara.

The mercaptan-comprising natural gas may be supplied at any suitable temperature.

The mercaptan-comprising natural gas may preferably be supplied to process at a gas hourly velocity in the range of from 100 to 100,000 Nl/kg/h (normal liters of gas per kilogram of catalyst in that zone per hour), more preferably of from 150 to 50,000 Nl/kg/h, even more preferably of from 200 to 5,000 Nl/kg/h. Reference herein to normal liters is to liters of gas at conditions of Standard Temperature and Pressure, i.e. 0° C. and 1 atmosphere.

In case natural gas stream comprises mercury it is preferred that the mercury is removed. More preferably, the mercury may be removed prior to the natural gas entering an amine unit. It is preferred that mercury is removed before the natural gas is introduced upstream of a SCO unit.

The invention is further exemplified by the embodiments shown in FIGS. 1 to 4, wherein:

FIG. 1 schematically shows an embodiment wherein the mercaptan-comprising natural gas stream is first directed to a selective amine unit.

FIG. 2 schematically shows an embodiment wherein the mercaptan-comprising natural gas stream is first directed to a non-selective amine unit.

FIG. 3 schematically shows another embodiment wherein the mercaptan-comprising natural gas stream is first directed to a non-selective amine unit.

Figure 4:
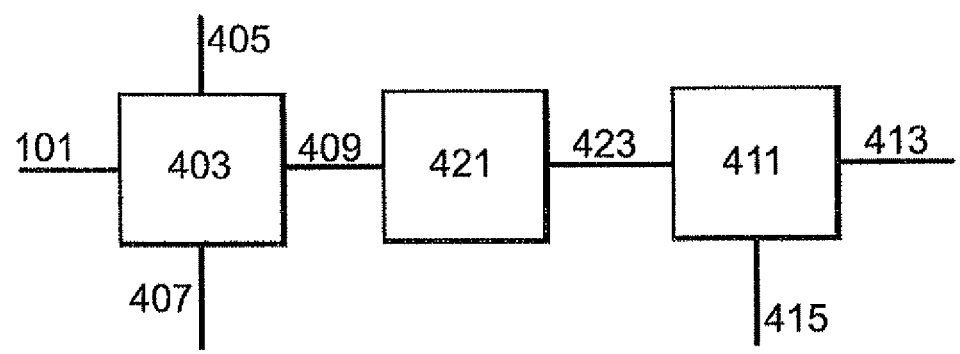

FIG. 4 schematically shows an embodiment wherein the mercaptan-comprising natural gas stream is first directed to a SCO unit.

In FIG. 1, mercaptan-comprising natural gas stream 101 is provided to selective amine unit 103, e.g. a MDEA-based amine unit. Selective amine unit 103 is selective for hydrogen sulphide and $CO_2$ and will not absorb significant amounts of mercaptans. At least part of the hydrogen sulphide and carbon dioxide present in mercaptan-comprising natural gas stream 101 is absorbed in the absorption liquid and separated from mercaptan-comprising natural gas stream 101 and first natural gas stream 105 is obtained, preferably comprising most of the mercaptans, which were present in natural gas stream 101. Preferably, at least 90 wt % of the hydrogen sulphide is removed (based on total amount of hydrogen sulphide present in gas stream 101), preferably 95 wt %, more preferably 98 wt %. Also, preferably, at least 90 wt % of the carbon dioxide is removed (based on total amount of carbon dioxide present in gas stream 101), preferably 95 wt %, more preferably 98 wt %. Especially hydrogen sulphide is removed till a level of less than 10 ppmv, more especially to a level of less than 5 ppmv. The laden absorption liquid contains the hydrogen sulphide, carbon dioxide and optionally COS. Suitably, the laden absorption liquid is regenerated in a regenerator (not shown) in the amine unit at relatively low pressure and high temperature. The laden absorption liquid is flashed to a pressure, which is below the sum of the partial pressures of the hydrogen sulphide and carbon dioxide present in the laden absorption liquid at the prevailing temperature, i.e. to a pressure usually between 1 and 5 bara. Flashing at atmospheric pressure is preferred. The temperature in the last flashing operation is suitably in the range of from 50 to 120° C., preferably between 60 and 90° C. Gas stream (second stream) 107 comprising hydrogen sulphide, carbon dioxide and optionally COS is obtained from selective amine unit 103 after regeneration of the absorption liquid. Second stream 107 may for instance be provided to a Claus unit (not shown) to convert the hydrogen sulphide to elemental sulphur and water. Optionally, after remover at least part of the carbon dioxide prior to feeding stream 107 to a Claus unit First natural gas stream 105 is provided to SCO unit 109 together with oxidant 111. In SCO unit 109, at least part of the mercaptans present in first natural gas stream 105 are converted to elemental sulphur, polysulphide and water. Due to the temperature in SCO unit 109, the elemental sulphur formed is liquid and can be discharged together with any polysulphide, dissolved in the elemental sulphur, and water via stream 113. Purified natural gas stream 115 exiting SCO unit 109 may be used for further applications. Optionally, purified natural gas stream 115 is further treated by providing purified natural gas stream 115 to a separation column, i.e. demethaniser 117. In demethaniser 117, purified natural gas stream 115 is separated in to a gaseous overhead stream 119, which is preferably enriched in methane, and a stream 121. Stream 121 is enriched in C2+ hydrocarbons. Residual mercaptans, still present in purified natural gas stream 115, predominately exit the demethaniser 117 in stream 121 from demethaniser 117. Stream 121 may be used as such for further application. Alternatively, bottom stream 121 is further treated to remove mercaptans. Bottom stream 121 may be provided to an additional mercaptan removal unit 123, preferably a SCO unit or caustic mercaptan removal unit, to remove the mercaptans and a purified C2+ comprising stream 125 is obtained. Stream 121 may also be recycled to SCO unit 109 (not shown). By recycling bottom stream 121, the capacity of SCO unit 109 is more efficiently used and no additional SCO unit needs to be provided.

In FIG. 2, mercaptan-comprising natural gas stream 101 is provided to non-selective amine unit 203, for instance a sulphinol-based amine unit. Suitably non-selective amine unit 203 is operated at a temperature of at least 20° C., preferably between 25 and 90° C., more preferably between 30 and 55° C., at a pressure between 15 and 90 bara. At least part of the hydrogen sulphide and carbon dioxide present in mercaptan-comprising natural gas stream 101 is absorbed in the absorption liquid and separated from mercaptan-comprising natural gas stream 101 and a purified natural gas stream 205 is obtained. Preferably, at least 90 wt % of the hydrogen sulphide is removed (based on total amount of hydrogen sulphide present in gas stream 101), preferably 95 wt %, more preferably 98 wt %. Also, preferably, at least 90 wt % of the carbon dioxide is removed (based on total amount of carbon dioxide present in gas stream 101), preferably 95 wt %, more preferably 98 wt %. In addition, a significant part of the mercaptans present in gas stream 101 are also absorbed in the absorption liquid and removed from gas stream 101. Suitably, the amount of mercaptans, which is removed is between 70 and 93% of the mercaptans present in gas stream 101, preferably between 75 and 90%. Preferably, purified natural gas stream 205 comprises less than 10 ppmv mercaptans.

The laden absorption liquid obtained in the process of the invention contains hydrogen sulphide, mercaptans, carbon dioxide and optionally COS and may also contain appreciable amounts of dissolved non-acid components from natural gas stream 101, e.g. C2+ hydrocarbons. Suitably, the laden absorption liquid is regenerated in a regenerator (not shown) at relatively low pressure and high temperature. A lean solvent is obtained and gas stream (second gas stream) 207, comprising hydrogen sulphide, mercaptans, carbon dioxide, C2+ hydrocarbons and optionally COS. It may be advantageous to remove the C2+ hydrocarbons components at least partially from the laden absorption liquid by flashing to a pressure which is higher than the sum of the partial pressures belonging to the hydrogen sulphide and carbon dioxide present in the laden solvent. In this way only small amounts of hydrogen sulphide and carbon dioxide are released from the solvent together with the C2+ hydrocarbons. In a second step the laden absorption liquid is flashed to a pressure, which is below the sum of the partial pressures of the hydrogen sulphide and carbon dioxide present in the laden solvent at the prevailing temperature, i.e. to a pressure usually between 1 and 5 bara. Flashing at atmospheric pressure is preferred. The temperature in the last flashing operation is suitably in the range of from 50 to 120° C., preferably between 60 and 90° C.

Purified natural gas stream 205 can be optionally further treated like purified natural gas stream 115 as described in under FIG. 1. Although purified natural gas stream 205 is depleted in mercaptan in non-selective amine unit 203, it may still contain mercaptans. Therefore, purified natural gas stream 205 may optionally be provided to SCO unit 209 together with oxidant 211. In SCO unit 209, at least part of the mercaptans still present in purified natural gas stream 205 are converted to elemental sulphur, polysulphide and water. Due to the temperature in SCO unit 209, the elemental sulphur formed is liquid and can be discharged together with any polysulphide, dissolved in the elemental sulphur, and water via stream 213. Resulting purified natural gas stream 215 exiting SCO unit 209 may be used for further applications. Optionally, purified natural gas stream 215 is further treated like purified natural gas stream 115 as described in under FIG. 1.

Gas stream (second stream) 207 comprises mercaptans, hydrogen sulphide, carbon dioxide, C2+ hydrocarbons and optionally COS. This stream is treated to remove the mercaptans and hydrogen sulphide in SCO unit 229. Gas stream 207 is provided to SCO unit 229 together with oxidant 231. In SCO unit 229, the mercaptans present in second stream 207 are converted to elemental sulphur, polysulphide and water. Due to the temperature in second SCO unit 229, the elemental sulphur formed is liquid and can be discharged together with any polysulphide, dissolved in the elemental sulphur, and water via stream 233. Stream 235 comprising predominantly C2+ hydrocarbons, carbon dioxide and optionally COS can be used in further applications such as the feed gas for an incinerator (not shown), optionally after being treated in an additional Claus unit (not shown).

In FIG. 3, mercaptan-comprising natural gas stream 101 is provided to non-selective amine unit 303 comparable to non-selective amine unit 203 as described herein before. A purified natural gas stream 305 is obtained, which is further treated like stream 205 in FIG. 2. In addition second gas stream 307 is obtained in the same manner as stream 207 in FIG. 2. Second stream 307, may comprise hydrogen sulphide, mercaptans, carbon dioxide, C2+ hydrocarbons and optionally COS. In case the hydrogen sulphide in stream 307 is to be removed using for instance a Claus unit, it may be preferred or even necessary to lower the carbon dioxide to hydrogen sulphide level in stream 307, this is particularly relevant in case of natural gas feeds which comprises high concentrations of carbon dioxide. This may be done by providing stream 307 to a subsequent selective amine unit 309, comparable to selective amine unit 103.

Typically selective amine units absorb hydrogen sulphide faster than carbon dioxide. Furthermore, by the right choice of amines the selectivity for carbon dioxide can be influenced., e.g. MDEA absorbs less carbon dioxide than DIPA. Therefore, a stream comprising hydrogen sulphide and carbon dioxide can be separated in a concentrated hydrogen sulphide stream and a hydrogen sulphide depleted carbon dioxide comprising stream by the right choice of amine and number of amine unit separation trays.

At least part, preferably most or even essentially all, of the hydrogen sulphide present in second stream 307 is absorbed in the absorption liquid and separated from second stream 307 and stream 311 is obtained, preferably comprising most of the mercaptans present in second stream 307. Stream 311, generally comprises too much mercaptans to be emitted directly into the atmosphere. However, due to the high carbon dioxide concentrations, which may be over 90 wt %, it is difficult to incinerate stream 311. Stream 311 is provided to a SCO unit 313 together with oxidant 315. In SCO unit 313, at least part of the mercaptans present in third stream 311 are converted to elemental sulphur, polysulphide and water under relatively mild conditions.

Stream 321, comprising at least part of the hydrogen sulphide present in second stream 307 may be provided to a Claus unit (not shown).

In case natural gas stream 101 comprises mercury, a separate mercury removal unit may be provided either prior to natural gas stream 101 entering amine units 103, 203 or 303. Alternatively, a mercury removal unit is provided in line 105, 205 or 305. It is preferred that mercury is removed before the natural gas is introduced upstream of a SCO unit.

In FIG. 4, mercaptan-comprising natural gas stream 101 is first provided to SCO unit 403 together with oxidant 405. Preferably, the natural gas stream 101 is depleted in mercury. In first SCO unit 403, at least part of the mercaptans present in natural gas stream 101 are converted to elemental sulphur, polysulphide and water. Due to the temperature in SCO unit 403, the elemental sulphur formed is liquid and can be discharged together with any polysulphide, dissolved in the elemental sulphur, and water via stream 407. First natural gas stream 409 exits SCO unit 403 and is provided to selective amine unit 411. In selective amine unit 411, at least part of any residual hydrogen sulphide and carbon dioxide present in first stream 409 is absorbed into the absorption liquid and purified natural gas stream 413 is obtained. After the absorption liquid is regenerated, as described herein above, second stream 415, comprising hydrogen sulphide and or carbon dioxide, exits selective amine unit 411. Selective amine unit 411 may be replaced by a non-selective amine unit, e.g. based on a sulphinol solvent. Such non-selective amine unit will also adsorb C2+ hydrocarbons, which are preferably contained in the purified natural gas. However, such non-selective amine unit may also remove at least part of any remaining mercaptans, which were not converted in the SCO unit. In addition, a non-selective amine unit may remove a larger part of the carbon dioxide present in first stream 409.

In case oxidant was provided to SCO unit 403 in an amount in excess of the stoichiometric ratio of oxidant and mercaptans and hydrogen sulphide present in natural gas stream 101, some oxidant, typically molecular oxygen of sulphur dioxide, may be present in first stream 409. In that case it may be preferred to provide first stream 409 to oxidant removal unit 421 prior to providing first stream 409 to the selective amine unit 411. Such amine units tend to be sensitive to oxidation, resulting in an increased amine consumption of the amine unit. Oxidant removal unit 421, may for example be an oxygen removal unit and comprise leading first stream 409 over an absorption bed comprising a hydrated iron sulphide compound or another metal sulphide compound that is converted to its oxide and elemental sulphur upon contacting it with oxygen. Such metal sulphide compounds that are suitable as oxygen absorbent are known in the art. When the absorbent is substantially saturated with oxygen, i.e. a substantial part of the metal sulphide compound is converted into its oxide, it will be regenerated by contacting it, preferably after vaporizing the sulphur formed, with a hydrogen sulphide containing gas. Stream 423 depleted in molecular oxygen can suitably be provided to selective amine unit 411.

Purified natural gas 413 can be further treated as described under FIG. 2. It will be appreciated that a recycle of bottom gas 121 is possible to SCO unit 403, if the capacity of SCO unit 403 allows for it.

Preferably, a water separation unit, e.g. a glycol-based water removal unit, is provided in streams 115, 215 or 413. Optionally, the water separation unit replaces SCO unit 209. The latter is of particular use, if the level of sulphur compounds in purified natural gas stream 205, exiting non-selective amine unit 203 is sufficiently low for further application. In such a case it may be desirable to provide first stream 205 to a water removal unit in order to lower the water content of resulting purified natural gas 215. If a water separation unit is provided in streams 115, 215 or 415, the amount of water to be removed is preferably at least 60 wt % of the water present in purified natural gas stream 105, 205, 409 or 423, preferably at least 90 wt %. Very suitably water is removed to a level of less than 1 wt % in the treated gas, i.e. the gas exiting the water separation unit, preferably less than 100 ppmwt based on the weight of the total gas stream.

EXAMPLE 1

Mercaptan Removal (Comparative Example)

A 250 ml autoclave reactor equipped with a magnetically coupled stirrer, a gas manifold to supply metered amounts of a gas via two separate dip tubes, a back-pressure regulator, a wet gas test meter and an on-line gas chromatograph was used for this experiment. 300 grams of sulphur powder was provided to the autoclave, no catalyst was added. The autoclave was heated to 135° C. After 2 hours, when the sulphur had melted the stirrer was started at 800 rpm. The vessel was pressurized to 40 barg using a gas stream of methane, which was fed via the dip tube below the liquid level. When the pressure level was reached, the feed gas flow was switched and adjusted to the desired flow rate (see Table 1).

Samples of the gaseous effluent were taken before each change in feed gas flow and at the end of the experiment. The samples were analyzed using online gas chromatography (equipped with a pulsed discharge detector). In this experiment, all analysis indicated the presence of hydrogen sulphide in the effluent gas. The mercaptan conversion was calculated. The results are shown in Table 1.

EXAMPLE 2

Mercaptan Removal in the Presence of Hydrogen Sulphide Using Oxygen as Oxidant (According to the Invention)

A precipitated iron oxide on silica powder with a nominal composition of 50% wt $Fe_2O_3$ and 50% wt $SiO_2$, a particle size D[v,50] of 10 micron and a BET surface area of 270 $m^2$/g, was obtained from Euro Support B.V. (Amersfoort, NL). The powder was treated in air at 450° C. for 2 hours, cooled down to room temperature.

A 2 cm cross section bubble column, height 25 cm reactor is mounted into an oven and equipped with a glass grid to support the catalyst, a gas manifold to supply metered amounts of a gas via two separate tubes below the glass grid, a back-pressure regulator, a wet gas test meter and an on-line gas chromatograph was used for the selective catalytic oxidation (SCO) experiment. The column was filled with 60 grams of solid sulphur and 3.0 grams of catalyst. The bubble column was pressurized with nitrogen up to 17 barg and heated to 139° C. When the pressure level and temperature was reached, the feed gas flow was switched to the mixture indicated in Table 1 at a total flow rate of 6 Nl/hr corresponding to a gas hourly space velocity of 2000 Nl/kg catalyst/hour. Samples of the gaseous effluent (the mercaptan depleted gas stream) were taken during the experiment. The samples were analyzed using online gas chromatography (equipped with a pulsed discharge detector). The mercaptan conversions were calculated. In addition it is shown that any hydrogen sulphide present in the stream is also converted. The result is shown in Table 1.

The results show that mercaptans comprised in a feed gas stream are effectively removed in a SCO process using molecular oxygen as oxidant, where significant amounts of mercaptan remain in the feed gas using only a temperature treatment. As can be seen in Table 1, the obtained purified gas stream contains limited levels of mercaptans.

EXAMPLE 3

Mercaptan Removal in the Presence of Hydrogen Sulphide Using Sulphur Dioxide as Oxidant (According to the Invention)

The experiments were conducted in quartz reactor, which was made in one piece from quartz. A filter was inserted to prevent the loss of catalyst. In order to prevent premature reaction upstream part of the reactor, the input of sulphur dioxide and hydrogen sulphide was separated until within the reactor by means of concentric feed pipes. The gases were then mixed in the chamber below the filter before passing through to the reactor section. The reactor had an internal diameter of 1.2 cm and a height of 21 cm. Total reactor volume was 100 ml. The whole reactor was set in an oven set at 130° C.

The temperature of the off-gas from the reactor was maintained at 110° C. until it reached the back pressure regulator in order to prevent water condensation. The off-gas was analyzed using an online GC. The GC system incorporated three separate detectors (Pulse Discharge and two Thermal Conductivity) with three separate columns (Mol sieve 5A, GasPro and Porapack Q). The GasPro column/PDD combination was used to separate and measure low concentrations of hydrogen sulphide, sulphur dioxide methanethiol and dimethyl disulphide (DMDS). The Mol sieve/TCD combination enabled the separation and measurement of high concentrations of methane and nitrogen. The Porapack Q/TCD combination allowed the measurement of high concentration hydrogen Sulphide, sulphur dioxide, carbon dioxide and water. COS and $CS_2$ concentrations were determined separately. The reactor was pressurized using a nitrogen flow. At the start to the experiment the nitrogen flow was replaced by the reactants.

The quartz tube reactor was filled with catalyst particles together with inert particles (SiC) to create a catalyst bed with well-defined flow properties. The catalyst bed had a volume of 20.67 ml of which 6.88 ml (7.49 gr) were catalyst. The catalyst was $TiO_2$ (P25). 1% Fe was added to $TiO_2$ catalyst by impregnation. The pore volume for this catalyst was approximately 0.3 ml/gram. The reactor was in an up-flow configuration, where the gas flow was conducted from the bottom of the reactor.

Hydrogen sulphide and sulphur dioxide were supplied to the reactor separately. A 1.01 vol % (based on the total volume on the mixture) hydrogen sulphide in methane mixture and a 1.47 vol % (based on the total volume on the mixture) sulphur dioxide in methane mixture were used. The hydrogen/methane mixture additionally comprised low amounts of COS. The reaction was allowed to run for approximately 80 hours, while producing liquid elemental sulphur. After 80 hours, methanethiol was added to the gas feed in the form of a 0.112 vol % (based on the total volume on the mixture) methanethiol in nitrogen mixture. The total flow rate was 7.75 Nl/hr. The temperature in the reactor was maintained at 130° C. The obtained conversions of hydrogen sulphide, sulphur dioxide and methanethiol and the COS content in the off-gas from the reactor are given in Table 1.

TABLE 1

Process conditions and results of examples 1, 2 and 3.

| example | | feed gas | $O_2/H_2S$ ratio | gas flow (Nl/hr) | P (barg) | $H_2S$ conversion (%) | mercaptan conversion (%) |
|---|---|---|---|---|---|---|---|
| 1 | a | 0.06 vol % $CH_3SH$ in $CH_4$ | | 9.9 | 40 | | 83 for $CH_3SH$ |
| | b | 0.046 vol % $CH_3SH$ in $CH_4$ | | 5.2 | 40 | | 88 for $CH_3SH$ |
| | c | 0.014 vol % $CH_3SH$ + 0.014 vol % $C_4H_9SH$ in $CH_4$ | | 16.8 | 30 | | 48 for $CH_3SH$; >97 for $C_4H_9SH$ |
| 2 | | 0.5 vol % $H_2S$, 0.0321 vol % $CH_3SH$, 0.0336 vol % $C_4H_9SH$, 1.23 vol % $O_2$, 25 vol % $N_2$, 33.3 vol % $CH_4$, 4.8 vol % $nC_5H_{12}$ and balance He | 2.46 | 6 | 17 | 99.9 | >99 for $C_4H_9SH$ >99 for $CH_3SH$ |
| | | | $SO_2/H_2S$ ratio | | | | |
| 3 | | 0.36 vol % $SO_2$ 0.70 vol % $H_2S$ 0.18 vol % $CH_3SH$ balance $CH_4/N_2$ | 0.52 | 7.75 | 20 | >99.9 | >98* |

*the $CH_3SH$ was below the detection limit of the used GC.

What is claimed is:

1. A process for purifying a natural gas stream, comprising:
providing a mercaptan-comprising natural gas stream to an amine-based separation unit;
contacting the mercaptan-comprising natural gas stream with an amine-containing absorption liquid in the amine-based separation unit and separating the mercaptan-comprising natural gas stream into a first natural gas stream enriched in mercaptans and a second stream;
providing at least part of the first natural gas stream enriched in mercaptans to a selective catalytic oxidation unit and converting at least part of the mercaptans in the first natural gas stream enriched in mercaptans into elemental sulphur in the selective oxidation unit-by selective catalytic oxidation to obtain a purified natural gas stream depleted in mercaptans.

2. A process according to claim 1, wherein the second stream is provided to a further selective catalytic oxidation unit.

3. A process according to claim 1, wherein the amine-based separation unit is a selective amine separation unit.

4. A process for purifying a natural gas stream, comprising:
providing a mercaptan-comprising natural gas stream to an amine-based separation unit;
contacting the mercaptan-comprising natural gas stream with an amine-containing absorption liquid in the amine-based separation unit and separating the mercaptan-comprising natural stream into a purified natural gas stream and a second stream enriched in mercaptans;
providing at least part of the second stream enriched in mercaptans to a selective catalytic oxidation unit and converting at least part of the mercaptans in the second stream enriched in mercaptans into elemental sulphur in the selective oxidation unit by selective catalytic oxidation.

5. A process according to claim 4, wherein the purified natural gas stream is provided to a further selective catalytic oxidation unit.

6. A process according to claim 4, wherein the amine-based separation unit is a non-selective amine separation unit.

7. A process according to claim 1, further comprising:
supplying at least part of the purified natural gas stream depleted in mercaptans to a separation column;
withdrawing a gaseous separation column overhead stream enriched in methane from the separation column to obtain a further purified natural gas stream;
withdrawing a stream enriched in C2+ hydrocarbons from the separation column;
removing mercaptans from the stream enriched in C2+ hydrocarbons.

8. A process according to claim 1 wherein the selective oxidation catalytic unit comprises an inert liquid medium, an oxidant containing gas, and an oxidation catalyst.

9. A process according to claim 8, wherein the oxidant comprises molecular oxygen and the oxidation catalyst comprises an oxide and/or sulphide compound of a metal.

10. A process according to claim 8, wherein the oxidant comprises sulphur dioxide and the oxidation catalyst is a catalyst comprising titanium dioxide or activated alumina or a combination thereof.

* * * * *